United States Patent Office 3,518,616
Patented June 30, 1970

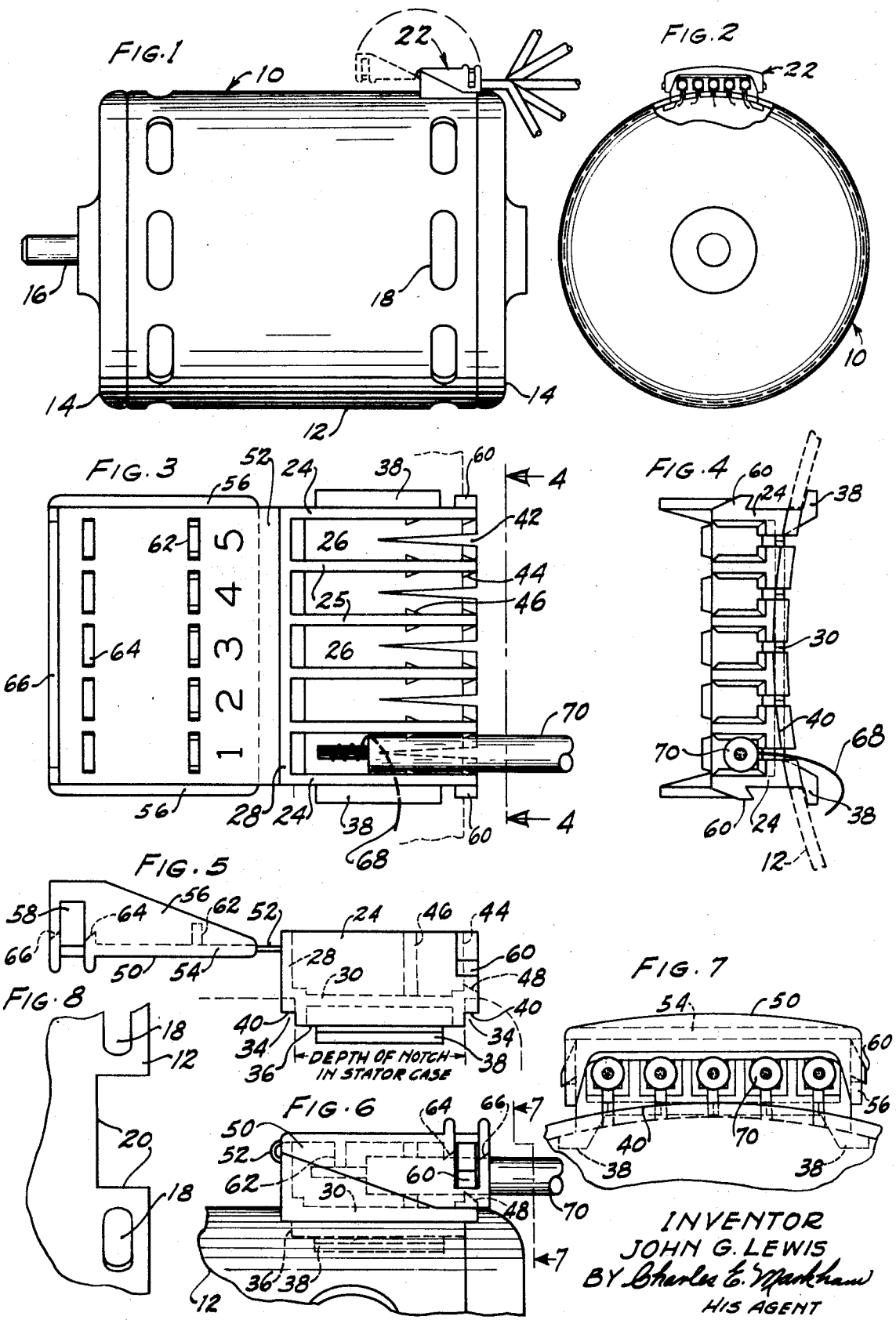

3,518,616
MOTOR LEAD CONNECTOR BOX
John G. Lewis, Dellwood, Mo., assignor to Emerson Electric Co., St. Louis, Mo., a corporation of Missouri
Filed July 1, 1968, Ser. No. 741,774
Int. Cl. H01r 13/58
U.S. Cl. 339—107         6 Claims

ABSTRACT OF THE DISCLOSURE

An electrical connector box for mounting on an electric motor casing. The box having a base portion to be entered into a cutout in the motor casing and a floor covering the casing cutout, the box further including a plurality of narrow elongated compartments open at one end for receiving soft insulated end portions of power supply leads and the walls defining the compartments having projecting barb elements to preclude axial movement of supply leads entered therein. The floor portion in each compartment having an elongated V-shaped opening therein for receiving and retaining by wedging action the end portion of a bare motor field winding to be connected to a power supply lead, the box further including a hinged cover and the complete device being formed as an integral casting of synthetic thermoplastic material.

---

This invention relates generally to electrical connector boxes within which connections of electrical wires are enclosed. More particularly, the invention concerns the provision of an electrical connector box adapted to encase and hold the connected ends of motor field windings and their supply leads and adapted to convenient mounting on an electric motor casing.

An object of the invention is to provide an electrical connector box for encasing and holding the connected ends of motor field windings and their supply leads, which box is arranged for particularly simple and inexpensive attachment to a conventional electric motor casing.

A further object is to provide an electrical connector box for encasing the connections of relatively small diameter motor field windings and relatively large diameter insulated supply leads which includes means for firmly gripping the ends of supply leads to prevent subsequent strain on the connections.

A further object is to provide an electrical connector box for enclosing and separating a plurality of motor field winding and supply lead connections which includes means for gripping and holding the ends of the motor field windings and means for gripping and holding the ends of the supply leads.

A further object is to provide an electrical connector box for encasing connections of motor field windings and supply leads comprising a plurality of compartments, each adapted to receive the end of a motor field winding and the end of a supply lead to be connected thereto, and in which each compartment includes means for gripping and holding the end of a field winding and means for gripping the end of a supply lead.

A further object is to provide an electrical connector box of the character set forth in the preceding paragraph which is formed as a casting of a nonconductive thermoplastic material, in which means gripping the ends of the field windings and the means gripping the ends of the supply leads are formed as an integral part of the casting and in which a hinged latching cover, including additional means for gripping the supply leads, is formed together with its hinge as an integral part of the casting.

Further objects and advantages will appear from the following description when read in connection with the accompanying drawing.

In the drawing:

FIG. 1 is a side elevational view of an electric motor having a connector box constructed in accordance with the present invention mounted thereon;

FIG. 2 is an end elevational view of an electric motor with connector box shown in FIG. 1;

FIG. 3 is an enlarged plan piew of an electrical connector box, constructed in accordance with the present invention, shown with the cover open;

FIG. 4 is an end elevational view of the connector box shown in FIG. 3 and is taken along line 4—4 of FIG. 3;

FIG. 5 is a side elevational view of the connector box shown in FIG. 3;

FIG. 6 is an enlarged side elevational view of the connector box shown mounted on a motor casing with its cover closed;

FIG. 7 is an end elevational view of FIG. 6 taken along line 7—7 of FIG. 6; and

FIG. 8 is a fragmentary portion of the motor casing showing the notch provided therein for receiving the connector box.

Referring to the drawing in more detail, an electric motor is generally indicated at 10, having a stator casing 12, end shields 14, and a drive shaft 16. The conventional casing 12, which is a cylinder with open ends adapted to receive end shields 14, is provided with the usual circularly arranged perforations 18 near the ends thereof to permit air circulation. At one end of the stator casing 12 a rectangular notch 20 is provided and occupies the position of one of the vent perforations 18, see FIG. 8.

The connector box, generally indicated at 22 in FIGS. 1 and 2, is of rectangular shape in plan, having sidewalls 24, parallel dividing walls 25 forming compartments 26, a rear wall 28 and a floor 30. There being no front wall, the compartments are open at the front of the connector box. The sidewalls 24 have portions which extend downward below the floor 30, which portions are shortened by notches 34 at each end thereof to provide central portions 36 having a length equivalent to the depth of notch 20 in the motor casing 12. The downwardly extending wall portions 36 enter and nicely fit the notch 20 in motor casing 12, see FIGS. 5 and 6.

Depending from the lower edges of these sidewall portions 36 are feet 38. The upper surfaces of feet 38 underlie and engage the inner wall surface of motor casing 12 along parallel sides of the casing notch 20 and prevent the upward movement of the connector box.

The horizontal surfaces 40 of notches 34 are arcuate, having the same radius as the outer surface of motor casing 12 and as the periphery of the adjacent end shield 14, and these arcuate surfaces 40 overlie and engage the motor casing and end shield and prevent downward movement of the connector box. Each of the compartments 26 has a long, narrow, V-shaped notch 42 in the floor thereof extending inward from the front of the box and converging inward to an apex substantially midway of the depth of the box. The ends of field windings to be connected to supply leads are entered into the compartments 26 and wedged into the V-shaped notches to hold them. Each of the side walls 24 on their inner surfaces and each of the dividing walls on both surfaces thereof have barbs 44 and 46 adapted to engage and grip the surfaces of relatively soft insulating coverings on supply leads entered into the compartments, thereby to hold them against axial withdrawal.

The barbs 44 near the front of the box and the barbs 46 positioned inwardly therefrom are formed integral with the walls 24 and 25 and extend as ribs from the upper ends of the side walls 24 to the floor 30. Each of the compartments 26 is also provided with barbs 48 formed as an integral part of the floor 30 and arranged to engage the lower surface portion of supply leads entered into the compartments, as indicated in FIG. 6. The connector box is provided with a hinged cover 50 formed integral therewith and joined to the box by a relatively thin strip 52 which, by reason of its thickness and by reason of the pliability of the thermoplastic material of which it is constructed, provides an effective hinge means. The cover 50 has a top wall 54, the under side of which engages the upper edges of the side walls 24, dividing walls 25, and rear wall 28 when the cover is closed. The cover 50 is also provided with side walls 56 which overlap the side walls 24 of the connector box. The fore ends of the side walls 56 have rectangular perforations 58 which receive tapered latching dogs 60 projecting from the outer surfaces of side walls 24 at their forward ends to hold the cover latched in a closed position.

The cover 50 is further provided with lugs 62 extending perpendicular from the under side of its top wall 54, which lugs enter the compartments 26 when the cover is closed to engage and hold down the connected ends of motor field windings and supply leads, see FIGS. 5 and 6. The cover 50 is further provided with barbs 64 projecting perpendicular from the under side of its top wall 54, which barbs enter the compartments 26, and a continuous barb 66 projecting downward from the under side of top wall 54 which overlaps the front side of the connector box when the cover is closed. The segmented barbs 64 and the continuous barb 66 engage the top side of the ends of supply leads at points spaced axially on opposite sides of the point of engagement of the lower continuous barb 48, see FIG. 6, and firmly grip the end portions of supply leads entered into the compartments 26.

It has been customary procedure in the manufacture of electric motors to make the connections of the supply leads to the field windings upon completion of the windings and to lace or tie the supply leads securely to the windings so as to prevent subsequent strain on the connections. This procedure entails repeated handling of the connected leads during subsequent manufacturing operations, the leads being quite long and of heavy gauge wire, in some cases, are exceedingly cumbersome. In the use of the connector box described, it is not necessary to lace or tie the supply leads on the winding to hold them so that the connections of the field windings to supply leads may be delayed until final assembly of the adjacent end shield.

In the use of the described connector box, the box with its cover open is slipped into the notch 20 in the stator casing just prior to final assembly operation of the adjacent end shield. The ends of the field windings 68 to be connected are then pulled into the box through the V-slots 42 in the floor thereof and wedged therein with sufficient end portions thereof extending above the floor to accomplish the desired connections to the supply leads. The connections to the supply leads 70 are then made after which the supply leads are entered and pressed downward into the compartments.

The diameter of the insulation covering of the supply leads is such that the barbs 44 and 46 are caused to dig into the surfaces of the insulation covering and grip the end portions of the leads. The adjacent end shield is now assembled on the end of the stator shell 12 so that now the open end of the casing notch is closed, thereby retaining the connector box, and the arcuate horizontal surface 40 of the forward notch 34 overlies a peripheral portion of the end shield. The cover 50 of the connector box is now closed and latched. As this is done the lugs 62 enter the compartments, insuring that the connections are pressed downward into the compartments, and the downwardly extending barbs 64 and 66 on the cover and the lower barbs 48 extending upward from the floor are caused to dig into the insulation covering of the supply leads, thereby further gripping these leads and insuring that strain on the connections is prevented.

I claim:

1. An electrical connector box adapted to house the connected ends of bare and insulated wires, said box having a floor, parallel side walls, a rear wall, and dividing walls parallel with said side walls forming a purality of compartments open at the front, each of said compartments having a V-shaped notch in the floor thereof extending and converging rearwardy from the front for receiving and gripping end portions of bare wires entered into said connector box from the under side thereof, said compartments being adapted to receive the end portions of insulated wires having a diameter approximately equal to the width of said compartments, said side walls and said dividing walls having barb elements projecting therefrom adapted to dig into the surfaces of insulated wires as they are pressed downwardly into said compartments thereby to hold them against axial outward movement, and a cover member closing the top of said connector box.

2. An electrical connector box as set forth in claim 1 in which said cover is hinged to said rear wall and in which means is provided at the front of said connector box for latching said cover securely in closed position and in which the floor of each compartment and said cover member are provided with barb elements which extend upward and downward, respectively, and which, when said cover is closed, engage the upper and lower surfaces of insulated wires entered into said connector box compartments.

3. An electrical connector box as set forth in claim 1 in which said cover is joined to said rear wall by a flexible hinge strip and in which said connector box, including said cover and hinge strip, is formed as an integral casting of thermoplastic material.

4. In an electric motor, a stator casing having an open end, a rectangular notch in the wall of said casing extending inward from its open end, an end shield attached to said casing and closing said open end thereof, a connector box housing connections of motor field windings and power supply leads mounted in said casing, said connector box having a base portion fitted into said notch and extending through said casing wall, and portions extending laterally from said base portion lying against the inner and outer surfaces of said stator casing and against the periphery of said end shield, and said connector box being held in said notch by said end shield, and said connector box being further provided with a floor covering said notch, which floor has a plurality of spaced openings therein through which the end portions of the motor field windings are entered into the connector box.

5. An arrangement as set forth in claim 4 in which said connector box has parallel side walls, a rear wall, and dividing walls parallel with said side walls forming elongated compartments extending from open ends at the open end of said casing notch to said rear wall and being adapted to receive longitudinally therein end portions of insulated supply leads, in which the floor of each compartment has an elongated V-shaped notch therein extending and converging inward from the open end thereof through which the end portion of a bare field winding wire to be connected to a supply lead is entered into a compartment and is wedged therein to hold it, in which said side walls and dividing walls are provided with barb elements projecting therefrom to engage the surfaces of insulated supply leads entered into said compartments, thereby to prevent their outward axial movement, and in which said connector box is provided with a hinged cover and means for securely latching it closed.

6. An arrangement as set forth in claim 4 in which said floor has a plurality of spaced V-shaped notches therein extending and converging inward from the open side of said notch in said stator casing through which end portions of field windings are entered into said connector box and gripped in position before said end shield is attached to the open end of said stator casing.

References Cited

UNITED STATES PATENTS

| | | | |
|---|---|---|---|
| 2,549,725 | 4/1951 | Uline | 339—44 |
| 2,639,313 | 5/1953 | Street. | |
| 2,715,212 | 8/1955 | Swanson | 339—44 |
| 3,293,463 | 12/1966 | Church | 310—77 |
| 3,304,447 | 2/1967 | Lindt | 310—71 |
| 3,440,592 | 4/1969 | Zelle | 310—71 |
| 3,440,594 | 4/1969 | Hopp | 310—71 |

WARREN E. RAY, Primary Examiner

R. SKUDY, Assistant Examiner

U.S. Cl. X.R.

310—71; 339—128